(12) United States Patent
Reiss et al.

(10) Patent No.: US 10,958,889 B2
(45) Date of Patent: Mar. 23, 2021

(54) METHODS, CIRCUITS, DEVICES, SYSTEMS, AND ASSOCIATED COMPUTER EXECUTABLE CODE FOR RENDERING A HYBRID IMAGE FRAME

(71) Applicant: MANTISVISION LTD., Petach Tikva (IL)

(72) Inventors: Addie Reiss, Gan Shlomo (IL); Robert Petka, Cecejovce (SK)

(73) Assignee: MANTISVISION LTD., Petach Tikva (IL)

( * ) Notice: Subject to any disclaimer, the term of this patent is extended or adjusted under 35 U.S.C. 154(b) by 0 days.

(21) Appl. No.: 16/450,284

(22) Filed: Jun. 24, 2019

(65) Prior Publication Data

US 2019/0313078 A1 Oct. 10, 2019

Related U.S. Application Data (62) Division of application No. 14/855,151, filed on Sep. 15, 2015, now Pat. No. 10,334,221.

(60) Provisional application No. 62/218,890, filed on Sep. 15, 2015, provisional application No. 62/050,491, filed on Sep. 15, 2014.

(51) Int. Cl.
| | |
|---|---|
| *H04N 13/156* | (2018.01) |
| *H04N 13/128* | (2018.01) |
| *H04N 13/167* | (2018.01) |
| *G06T 19/20* | (2011.01) |
| *H04N 13/361* | (2018.01) |

(52) U.S. Cl.
CPC ............ *H04N 13/156* (2018.05); *G06T 19/20* (2013.01); *H04N 13/128* (2018.05); *H04N 13/167* (2018.05); *H04N 13/361* (2018.05); *G06T 2219/2004* (2013.01)

(58) Field of Classification Search
CPC ............ G06T 19/20; G06T 2219/2004; H04N 13/128; H04N 13/156; H04N 13/167; H04N 13/361
See application file for complete search history.

(56) References Cited

U.S. PATENT DOCUMENTS

| | | | |
|---|---|---|---|
| 8,232,990 B2 | 7/2012 | King et al. | |
| 8,537,201 B2 | 9/2013 | Choi et al. | |
| 2012/0075290 A1* | 3/2012 | Kurosaki | ................ G06T 15/10 345/419 |
| 2013/0127849 A1 | 5/2013 | Marketsmueller et al. | |
| 2015/0249817 A1 | 9/2015 | Roelen et al. | |

OTHER PUBLICATIONS

Brooks, S., and Whalley, "Toward a Comprehensive Multi-Layer Hybrid Display of GIS Data." *Proceedings of* GISRUK, pp. 215-219, Maynooth (2007).

* cited by examiner

*Primary Examiner* — Farzana Hossain
(74) *Attorney, Agent, or Firm* — Finnegan, Henderson, Farabow, Garrett & Dunner LLP (57) ABSTRACT

The present application discloses methods, circuits, devices, systems and associated computer executable code for rendering one or more hybrid images including both two dimensional and three dimensional image information from an object or person. According to some embodiments, data from 2D image frame may be combined with a corresponding 3D image dataset to generate a hybrid image frame. Display parameters and/or relative coordinates of the 2D and/or 3D image data may be adjusted or altered across hybrid image frames.

3 Claims, 9 Drawing Sheets

METHODS, CIRCUITS, DEVICES, SYSTEMS, AND ASSOCIATED COMPUTER EXECUTABLE CODE FOR RENDERING A HYBRID IMAGE FRAME

RELATED APPLICATIONS

The present application is a divisional of U.S. application Ser. No. 14/855,151, filed Sep. 15, 2015 (now U.S. Pat. No. 10,334,221), which claims priority from U.S. Provisional Patent Application: 62/050,491, filed Sep. 15, 2014, and 62/218,890, filed Sep. 15, 2015. All of the foregoing applications are hereby incorporated by reference in their entirety.

TECHNICAL FIELD

The present application relates generally to the field of image acquisition, processing and rendering. More specifically, the present invention relate to methods, circuits, devices, systems and associated computer executable code for rendering one or more hybrid images including some combination of 2D and 3D image information, optionally in a multilayered display format.

BACKGROUND

In Brooks, S., and J. Whalley. "Towards a Comprehensive Multi-layer Hybrid Display of GIS Data." Proceedings of GISRUK, Maynooth (2007): 215-219. Disclose a hybrid 2D/3D system which seamlessly integrate 2D and 3D views within the same window. The system visualizes multiple layers of information that can be continuously transformed between 2D and 3D over a base terrain.

US Patent Publication No. 2013/0127849 to Marketsmueller et. al. (hereinafter: "Marketsmueller") discloses a multimedia presentation including 2D and 3D content integrated into a common rendering framework and common event model. In Marketsmueller the 2D and 3D content may be rendered based on a specification of one or more rendering effects to be applied to both the 2D and 3D content. In response to an event pertaining to the 2D and 3D content, an effect may be applied to the 2D and 3D content according to the common event model. Creation of the multimedia presentation may include receiving a specification of one or more rendering effects to be applied to the 2D and 3D content and may also include receiving a specification of one or more event effects to the 2D and 3D content.

U.S. Pat. No. 8,232,990 to King et. al. (hereinafter: "King") relates to the generation of three-dimensional objects based on two-dimensional objects. According to King, a first user input identifying a 2D object presented in a user interface can be detected, and a second user input including a 3D gesture input that includes a movement in proximity to a surface can be detected. A 3D object can be generated based on the 2D object according to the first and second user inputs, and the 3D object can be presented in the user interface.

SUMMARY

The present invention may include methods, circuits, devices, systems and associated computer executable code for rendering a hybrid image of a scene. According to some embodiments, both two dimensional (2D) image information and three dimensional (3D) image information may be mixed together and co-rendered as part of a hybrid image frame and/or as part of a sequence of hybrid image frames, for example a video stream composed of hybrid image frames.

According to some embodiments of the present invention, one or more points of a 2D image frame may be correlated and/or linked to one or more points of a corresponding 3D image dataset, wherein a corresponding 3D image dataset may be a dataset which includes depth information for one or more points of the 2D image frame with which the 3D image dataset corresponds. The 2D image frame and corresponding 3D image dataset may be derived from a computer generated representation of an object. Alternatively, the corresponding 2D and 3D image datasets may each be acquired from the same scene, optionally concurrently, wherein acquisition may be performed by 2D and 3D image sensors respectively.

According to embodiment, one or more points of the 3D image dataset may be assigned a color value which is a function of a color value of one or more correlated or linked points on a corresponding 2D image frame. For example, the one or more points of the 3D image dataset may be assigned a color value substantially identical to a linked point on a corresponding 2D frame. The one or more points of the 3D image dataset may also be assigned one or more display parameters, for example: (1) a transparency value, (2) an opacity value, (3) a reflectivity value, and (4) any other value which may be used by a rendering engine to render the one or more points of the 3D image dataset on a visual display, projector or other visual presentation appliance.

A rendering engine according to embodiments, including image data processing circuitry, may render on a display a 2D image frame along with a corresponding 3D image dataset concurrently within the same virtual space. According to some embodiments, the rendering engine may render the 2D image frames and 3D image datasets as multilayers of the same video frame. According to embodiments where the 2D frame and 3D datasets are each associated with an image/video frame of a respective video sequence or stream, the rendering engine may render a sequence or stream of hybrid image/video frames, wherein each hybrid frame may include some combination of a 2D image frame and points from a corresponding 3D image dataset. According to further embodiments, the rendering engine may render multiple hybrid image/video frames from a single 2D image frame and its corresponding 3D image dataset. The rendering engine may also combine information from multiple 2D image frames together with multiple corresponding 3D image dataset into a single hybrid image frame.

Additionally, the rendering engine or functionally associated image processing circuitry may select and/or deselect portions of one or more 2D image frames and corresponding 3D image datasets for inclusion within a hybrid image frame according to embodiments. Therefore, a hybrid image frame according to embodiments may include some or all of a constituent 2D image frame and may include some or all of a constituent 3D image dataset.

According to some embodiments, as part of generating a hybrid frame, the rendering engine, or a functionally associated image processing circuit, may alter data of the 2D image frame and/or data of the 3D image dataset prior to rendering the hybrid frame on a display. Altering may include changing a display parameter of one or more points on the 2D image frame and/or changing a display parameter of one or more points on the 3D image dataset, for example changing a transparency level of one or more of the points. Altering may also include changing a relative coordinate of one or more points of the 2D image frame relative to the rest of image frame. Altering may also include changing a relative coordinate of one or more points on the 3D image dataset relative to the rest of the 3D image dataset, for example changing a depth of the one or more points on the 3D image dataset.

A rendering engine according to embodiments may generate a sequence of hybrid image frames, from one or more 2D image frames and respective corresponding 3D image datasets, wherein display parameters, and optionally the coordinates, of the 3D image points are altered across at least two of the frames from the sequence of hybrid frames. According to some embodiment, the 3D points' display parameters may be altered such that initial hybrid frames of the sequence appear to lack 3D points, for example by setting the 3D points' display parameters to total transparency only having the 2D image frame visible. According to some yet further embodiment, the 3D points' coordinates may be altered such that initial hybrid frames appear to lack 3D points, for example by setting the 3D points' coordinates to have a substantially zero depth and to overlap with the 2D image frame. According to embodiment, the 2D image frame points' display parameters may be altered such that relatively later hybrid frames of the sequence appear to lack 2D points, for example by setting the 2D points' display parameters to total transparency and only having the 3D image points visible. According to some embodiments, the rendering engine may generate a one or more hybrid frames including complimentary 2D image points and corresponding 3D image points of the same object or person.

A rendering engine according to embodiments of the present invention may also be adapted to render the 3D image data within a virtual environment including a virtual lighting source. According to certain embodiments, a position of a virtual lighting source within the rendered virtual environment relative to an object rendered within the virtual environment using the 3D dataset may correspond to an actual relative location or direction of the imager (camera) used to acquire/sample the 3D image dataset from the actual object.

According to further embodiments, a rendering engine may add 3D image data to 3D image dataset. The rendering engine may add filler points, such as black colored points, to the 3D image dataset. These points may prevent or mitigate a see through effect during rendering when the 3D dataset is does not include a densely packed set of points.

A rendering engine according to embodiments may be integral or otherwise functionally associated with a display. Accordingly, under certain circumstances the terms rendering engine and display may be used interchangeably.

According to an aspect of the presently disclosed subject matter, there may be provided methods, circuits, devices, systems and associated computer executable code for displaying multilayered visual data. Aspects of the present invention may include: obtaining a 2D video stream and a 3D video stream, where the 2D and the 3D video streams may be synchronized; generating a multilayered visual display from the 2D and the 3D video streams, where in each of a plurality of (hybrid) frames of the display, a 3D layer corresponding to the 3D video stream can be provided wherein a depth value of each display point can be set by its original depth value in the 3D video stream as adjusted by a current depth adjustment factor.

According to further examples, over the plurality of frames of the display, a gradual adjustment rule can be applied to the current depth adjustment factor, such that over consecutive frames of the multilayered visual display the depth adjustment factor changes gradually.

According to yet further embodiments, the depth adjustment factor changes gradually, from hybrid frame to hybrid frame, such that an appearance of the 3D layer transitions towards no depth or shallow depth values in the 3D video stream. Still further by way of example, the current depth adjustment factor can be based on a user selection.

According to yet another example, in each of the plurality of frames of the display, a distance between a 2D layer corresponding to the 2D video stream and the 3D layer can be determined according to a displacement factor. The displacement factor can be associated with the depth adjustment factor.

In a further example, each of the plurality of frames of the display comprises a 2D layer corresponding to the 2D video stream, and wherein a visibility of the 2D layer can be set according to a 2D layer visibility factor, an wherein the 2D layer visibility factor can be associated with the depth adjustment factor.

In still a further example, in each of the plurality of frames, the 3D layer comprises a space of interest, and wherein the depth adjustment factor is applied exclusively within the space of interest. For example, within the space of interest a first depth adjustment factor can be applied and within a not-of-interest space of the 3D layer a second depth adjustment factor is applied. In yet a further example, the space of interest can be defined by a range of interest or by a region of interest.

In a further aspect, the present disclosure relates to a method of displaying multilayered visual data including: obtaining a 2D video stream and a 3D video stream, where the 2D and the 3D video streams are synchronized; and generating a multilayered visual display from the 2D and the 3D video streams, where over a sequence of a plurality of frames of the multilayered display, gradually accentuating a visual appearance of a 3D layer corresponding to the 3D video stream relative to a visual appearance a of 2D layer corresponding to the 2D video stream, and further over the sequence of the plurality of frames gradually accentuating a depth property of the 3D data underlying the 3D layer.

In a further example, gradually accentuating a visual appearance of a 3D layer corresponding to the 3D video stream relative to a visual appearance of a 2D layer corresponding to the 2D video stream, comprises gradually increasing a displacement between the 3D layer and the 2D layer.

In yet a further example, increasing a displacement comprises at least one of: gradually moving the 3D layer forwards to a front portion of a virtual display space or gradually moving the 2D layer backwards to a back portion of a virtual display space.

Further by way of example, gradually accentuating a visual appearance of a 3D layer corresponding to the 3D video stream relative to a visual appearance a of 2D layer corresponding to the 2D video stream, comprises at least one of: reducing the luminance of the 2D, reducing the density of the pixels in the 2D layer, reducing the contrast in the 2D layer, increasing the luminance in the 3D layer, increasing the density of the pixels in the 3D layer, and/or increasing the contrast in the 3D layer.

Still further by way of example, gradually accentuating a depth property of the 3D data underlying the 3D layer comprises: gradually adjusting a depth value of the 3D data underlying the 3D layer according to an original depth value of a corresponding point in the 3D video stream and a current depth adjustment factor.

The method according to a current depth adjustment factor can be gradually updated over the sequence of the plurality of frames, such that a depth effect in the 3D layer can be respectively gradually accentuated over the sequence of the plurality of frames.

DETAILED DESCRIPTION

In the following general description, numerous specific details are set forth in order to provide a thorough understanding of the presently disclosed subject matter. However, it will be understood by those skilled in the art that the presently disclosed subject matter may be practiced without these specific details. In other instances, well-known features, structures, characteristics, stages, methods, procedures, modules, components and systems, have not been described in detail so as not to obscure the presently disclosed subject matter.

Unless specifically stated otherwise, as apparent from the following discussions, it is appreciated that throughout the specification discussions utilizing terms such as "processing", "calculating", "computing", "determining", "generating", "setting", "configuring", "selecting", "obtaining", "modifying", "providing", "detecting", or the like, include action and/or processes of a computer that manipulate and/or transform data into other data, said data represented as physical quantities, e.g. such as electronic quantities, and/or said data representing the physical objects. The terms "computer", "processor", and "controller" should be expansively construed to cover any kind of electronic device with data processing capabilities, or a part thereof.

The term computer should be expansively construed to cover any kind of electronic device or system with data processing capabilities and which is made up of any combination of hardware, software and/or firmware and which includes at least some hardware, even if not labeled as such in the disclosure.

The operations in accordance with the teachings herein may be performed by a computer specially constructed for the desired purposes or by a general purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein the term "memory" refers to any readable medium for storing data for the short and/or long term, locally and/or remotely. Examples of memory include inter-alia: any type of disk including floppy disk, hard disk, optical disk, CD-ROMs, magnetic-optical disk, magnetic tape, flash memory, random access memory (RAMs), dynamic random access memory (DRAM), static random access memory (SRAM), read-only memory (ROMs), programmable read only memory PROM, electrically programmable read-only memory (EPROMs), electrically erasable and programmable read only memory (EEPROMs), magnetic card, optical card, any other type of media suitable for storing electronic instructions and capable of being coupled to a system bus, a combination of any of the above, etc.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

The term "3D model" is recognized by those with ordinary skill in the art. The following definition and examples are provided for illustration purposes. In general, the term 3D model refers to any kind of representation of a 3D object, a 3D scene, a 3D prototype, a 3D shape, a 3D design and so forth, either static or moving. A 3D model can be represented in a computer in different ways. Some example includes the popular range image, where one associate a depth for pixels of a regular 2D image. Another simple example is the point cloud, where the model consists of a set of 3D points. A different example is using polygons, where the model consists of a set of polygons. Special types of polygon based models include: (i) polygon soup, where the polygons are unsorted; (ii) mesh, where the polygons are connected to create a continuous surface; (iii) subdivision surface, where a sequence of meshes is used to approximate a smooth surface; (iv) parametric surface, where a set of formulas are used to describe a surface; (v) implicit surface, where one or more equations are used to describe a surface; (vi) and so forth. Another example is to represent a 3D model as a skeleton model, where a graph of curves with radii is used. Additional examples include a mixture of any of the above methods. There are also many variants on the above methods, as well as a variety of other methods. It is important to note that one may convert one kind of representation to another, at the risk of losing some information, or by making some assumptions to complete missing information.

3D cameras for mobile devices, such as smartphones or tablets which support user generated 3D data are emerging into the market. One example is the project Tango tablet, which is currently sold by Google Inc. of Mountain View, Calif. to developers. The project Tango tablet uses a 3D camera, and a 3D sensing technology that was developed by Mantis-Vision Ltd. of Petah Tikva, Israel. User generated 3D content is not yet on par, in terms of visual quality, with the much advanced 2D (color) photography that is used today in mobile devices. For example, certain areas of a scanned 3D object may be missing, and while post processing can fill in some of the gaps in the 3D data, some holes may remain, especially when the processing of the 3D data is limited (in time or in resources).

Moreover, in many cases the 3D data that is scanned by users does not provide a full coverage of the object, and so the 3D model may not be complete.

In order to provide a viewer of a less-than-perfect 3D data with a more familiar viewing experience, and perhaps with an enhanced experience, examples of the presently disclosed subject matter provide a multimedia player, a multimedia processing method which applies certain visual effects to a multilayered video sequence that includes at least a 2D video layer and a 3D video layer. The present disclosure also covers a non-transitory computer-readable storage medium which stores corresponding program instructions.

Figure 1:
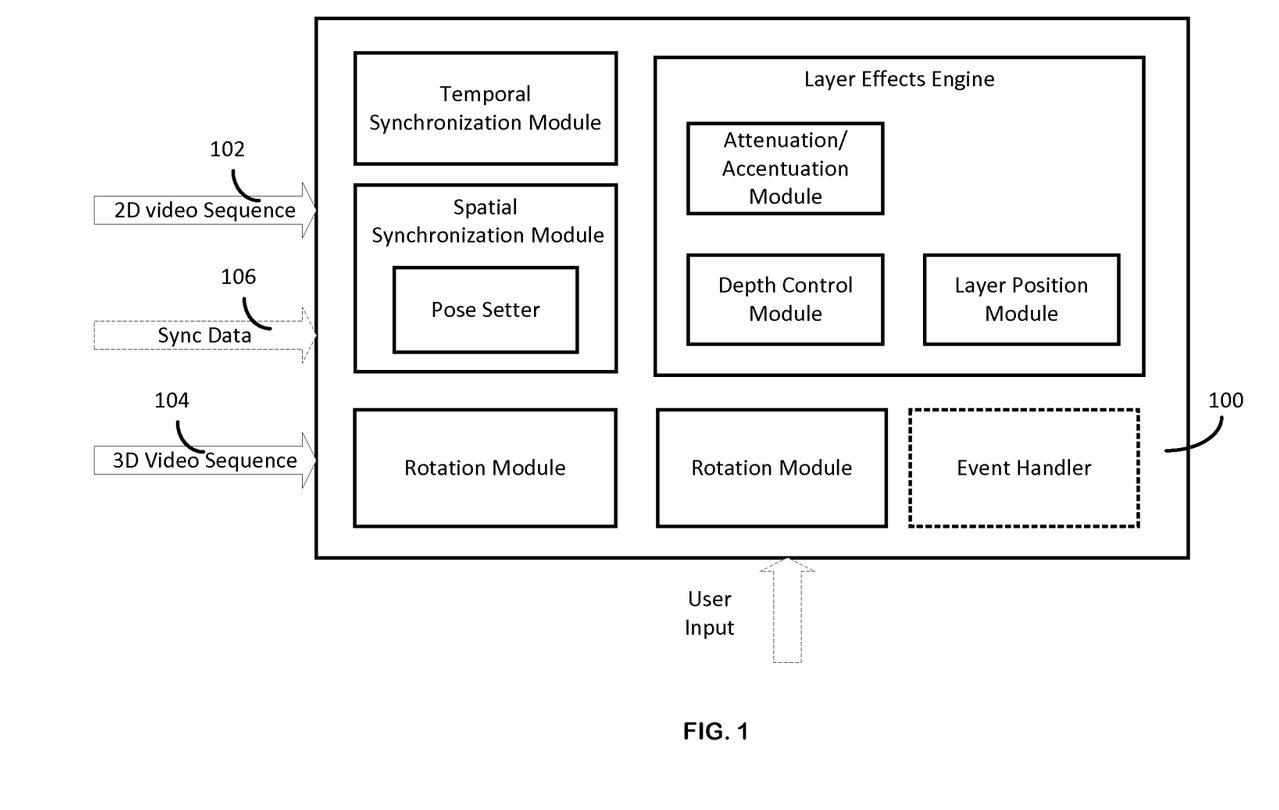
FIG. 1 is a block diagram of a multimedia player according to examples of the disclosed subject matter.

Reference is now made to FIG. 1, which is a block diagram of a multimedia player according to examples of the presently disclosed subject matter. According to examples of the presently disclosed subject matter, there is provided a multimedia player 100. The multimedia player 100 is capable of playing back a multilayered video sequence that includes at least a 2D video layer and a 3D video layer. The multimedia player 100 is configured to apply certain effects to the multilayered video to enhance the viewing experience. It would be appreciated that the multimedia player 100 according to examples of the presently disclosed subject matter can be a suitable programmed special purpose computer, a suitable programmed general purpose computer or dedicated hardware that is configured to carry out the operations disclosed herein.

Figure 2:
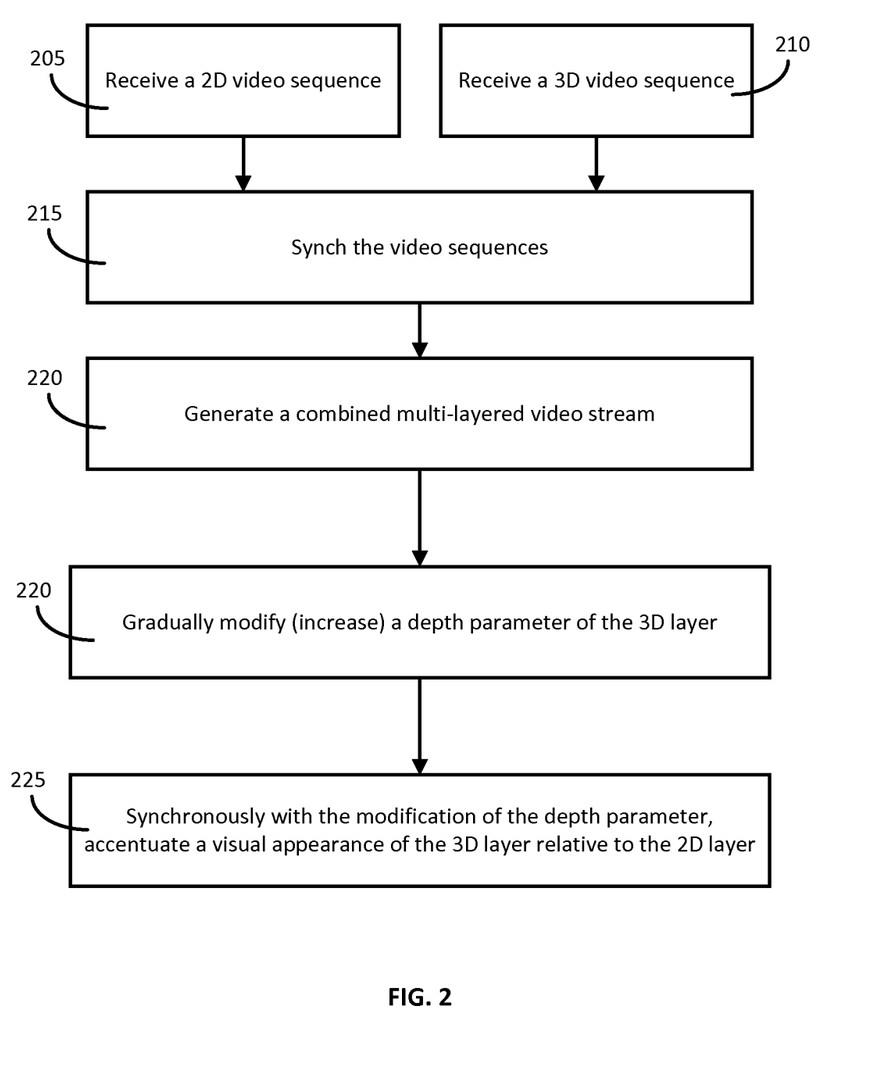
FIG. 2 is a flowchart illustrating a method of displaying multi-layered visual data, according to examples of the disclosed subject matter.

Reference is additionally made to FIG. 2 which is a flowchart illustration of a method of displaying multilayered visual data, according to examples of the presently disclosed subject matter. It would be appreciated that the method in FIG. 2 can be carried out by the multimedia player 100 of FIG. 1, but in other examples, the method in FIG. 2 can be carried out by other players, and such other players can have different configurations.

According to examples of the presently disclosed subject matter, multiple video streams can be received. In particular, as is shown in FIGS. 1 and 2, a 2D video sequence 102 (block 205) and a 3D video sequence 104 (block 210) can be received at the player 100. In addition, synchronization data 106 can also be received. The synchronization data can provide temporal and spatial alignment information to allow the synchronization of the various input. It would be appreciated that the information that is for synchronizing the input streams can be derived from the streams themselves. Such information may be included in the input streams as metadata or it may be derived from the input streams, e.g., via image or video processing.

It would also be appreciated that the input is not necessarily provided as separate streams and the player and playback method according to examples of the presently disclosed subject matter can also be applied to and multilayered input stream which includes a 2D layer and a 3D layer. In this regard, it would be appreciated that blocks 215-220 which describe the processing of the input video streams and the generation of the combined multilayered visual display are also optional.

At block 215 the 2D and 3D video sequences are synchronized. By way of example, synchronization includes at least one of: temporal synchronization and spatial alignment. Still further by way of example, temporal synchronization can include adding timestamps, interpolating frames, down-sampling frames etc. The temporal synchronization can be carried out by the temporal synchronization module 10.

Spatial alignment can include setting the position of the different layers relative to each other. In FIG. 1, the spatial synchronization is carried out by the spatial alignment module 14. The spatial alignment can be carried out in 3D, for example, by providing X, Y, Z coordinates for the 3D layer or for certain objects in the scene depicted by the content of the 3D layer. Since the perspective projection of 3D data can usually be adjusted, the synchronization module 14 can include a perspective projection module 16 which is capable of setting the perspective or the pose or the orientation (these terms are used interchangeably in the description) of the 3D data (e.g., 3D object) to match the orientation of the 2D video sequence. The spatial alignment module 14, and in particular the perspective projection module 16 can be in communication with a pose estimation module 18 of the player 100, which estimates the pose of the objects appearing the 2D video sequence. The spatial alignment can be carried out for each frame or for a number of frames. If the scene in the 2D video sequence is dynamic, either due to motion of an object or objects in the imaged scene, or as a result of camera motion, the orientation of the object or objects in the scene can change during the sequence, the pose estimation module 18 can track such changes and can provide indications regarding the orientation of the 2D video at each frame, or whenever the orientation changes, or at a certain interval (e.g., every other frame).

The spatial alignment module 14 can further include a scaling module 17 that is configured to scale the 3D content in the 3D layer. For example, the scaling module 17 can be configured to scale a 3D object in the 3D layer to match a size of a corresponding 2D object in the 2D layer. It would be noted that the size of the object(s) appearing in the 2D layer can change across frames, and so the scaling module 17 can be capable of dynamically adjusting the scale of a 3D object in the 3D layer, as necessary.

The player 100 can further include a visual appearance adjuster 20. The visual appearance adjuster 20 is capable of changing visual properties of a 3D object(s) the 3D layer, for example, based on the visual properties of content in the 2D layer. For example 3D object can be adjusted according to the visual properties of corresponding 2D object in the 2D layer. Examples of visual properties can include color and luminance properties, for example.

Figure 3:
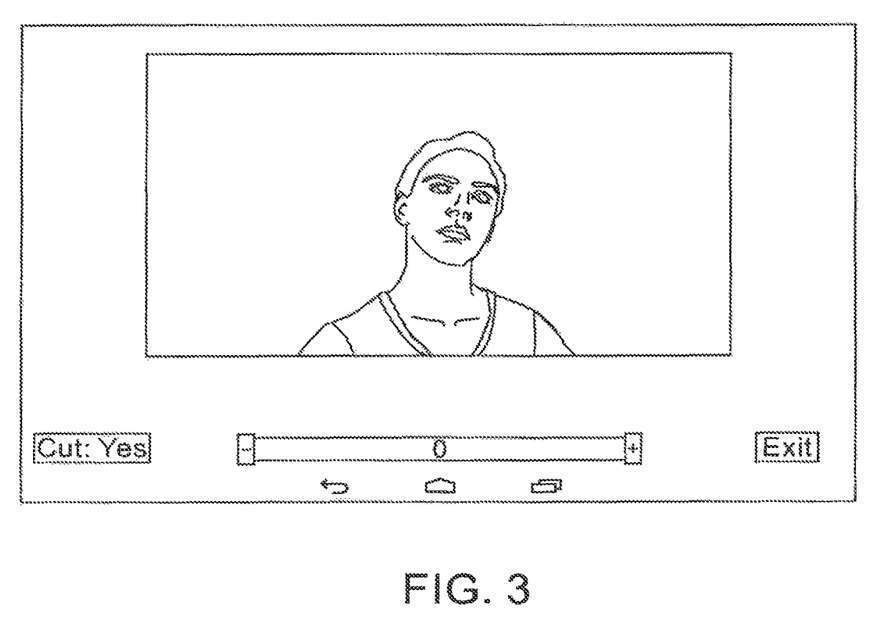
FIG. 3 is a rendering showing the initial state of the multilayer visual display, where the 3D layer is invisible.

Resuming now the description of FIG. 2, at block 220 the multilayer visual display can be generated (block 220). According to examples of the presently disclosed subject matter, the initial appearance of the multilayer visual display can be predefined. For example, initially the multilayer visual display can show the 2D layer which corresponds to the input 2D video sequence (possibly some adjustments) and the 3D layer can be invisible or 100% transparent. For example, the initial appearance of the multilayer visual display can be similar to the screenshot image shown in FIG. 3. As is shown in FIG. 3, the initial view of the multilayer visual display can be substantially identical to 2D video sequence.

Figure 4:
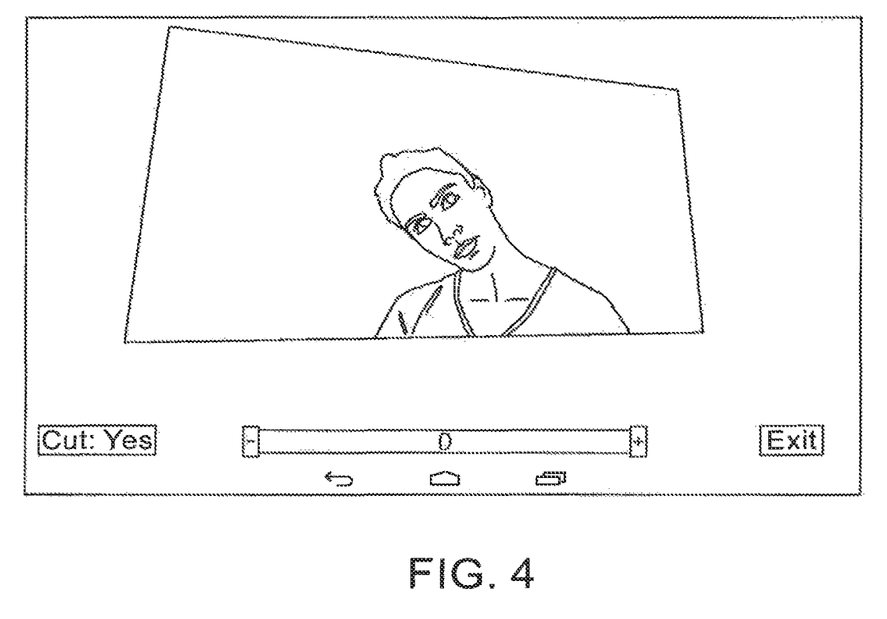
FIG. 4-5 are renderings showing the 2D layer rendered to appear as if it is being rotated in a 3D shape, where the 3D layer is invisible.
Figure 5:
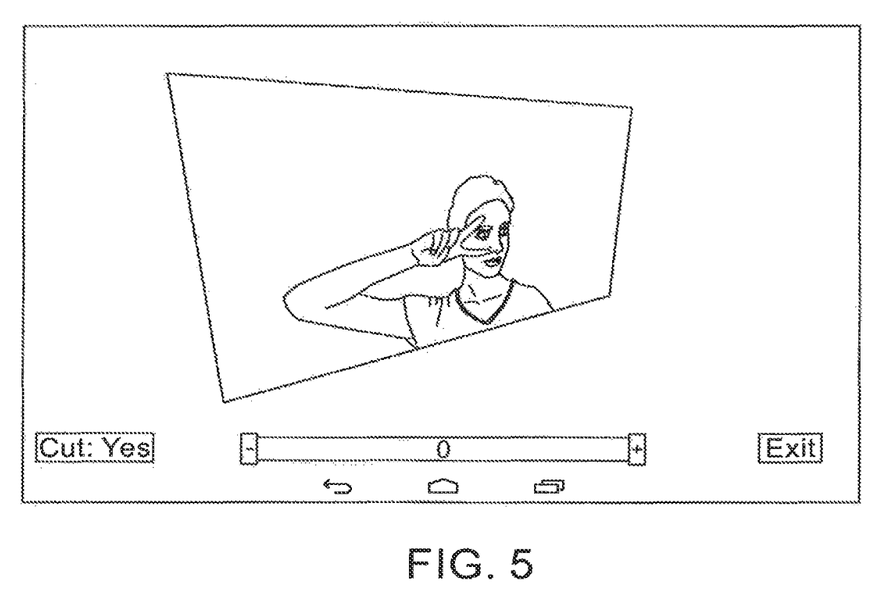
Figure 6:
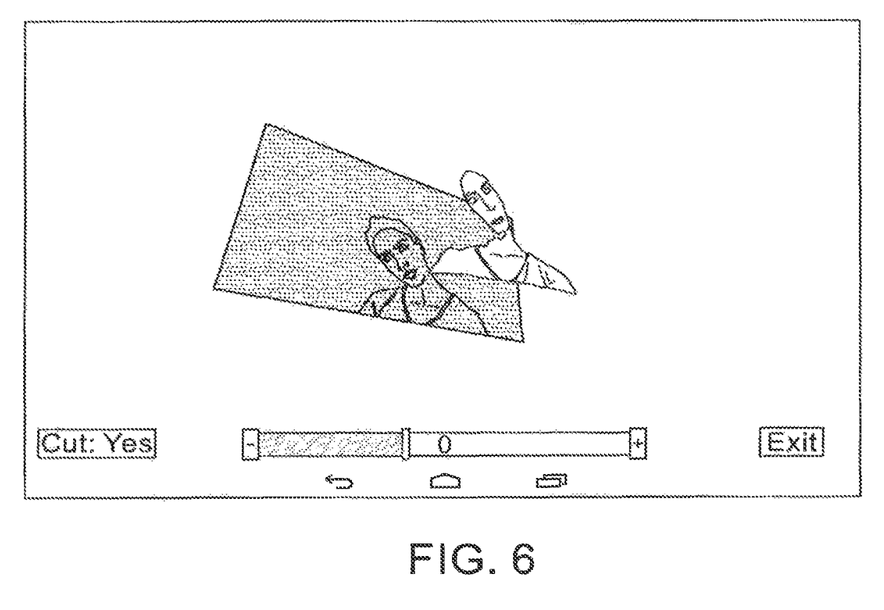
FIG. 6 is a rendering showing the initial visible state where the depth of the 3D content in the 3D layer is almost flat, the 2D layer and the 3D layer are displayed relatively close to one another, and the 2D layer is only slightly faded.

According to examples of the presently disclosed subject matter, the orientation of the multilayer visual display can be modified. When the multilayer visual display is in the initial state, which is for example, identical to the 2D video sequence and not rotated at all, the user, operating a touch sensitive display, can swipe a finger towards the edges of the screen and by doing so, the user can rotate the multilayer visual display. FIGS. 4 and 5 are screenshots of the multi-layered visual display in a rotated state during a time when only the 2D layer is visible. For example, the screens in FIGS. 4 and 5 may represent the state of the multilayered visual display shortly after the beginning of the playback and before the 3D layer is presented. The rotation can be applied in any form and the multi-layered visual display can be rotated about any shape or about any segment of a shape (e.g., a sphere, a hemisphere, a quadrosphere, a cube, etc.). It would be noted that the modification of the orientation can be automatic or controlled by a program and is not necessarily a result of manual operation by a user.

By way of example, the player 100 can include a rotation module 30 to facilitate and control the rotation of the multilayer visual display. The player 100 can also include a communication module 50 and an event handler 40 to allow a user or an external program to pass instructions to the player 100, and possibly also to receive feedback or instructions from the player 100.

At some point, e.g., by instruction from the user, the 2D layer and the 3D layer can be displayed simultaneously. By way of example, the transparency value of the 3D layer can be adjusted to render it visible. Still further by way of example, the transparency can be turned to 0% or can be set to some intermediary value. According to examples of the presently disclosed subject matter, in addition to the player's modules that are responsible for creating the multilayer visual display, the player 100 can include a layers effects module 60 that is configured to control the appearance of each of the layers during playback. It would be appreciated that the layers effects module 60 can in some example also incorporate additional components including some of the components that participate in the creation and the initialization of the multilayer visual display.

Non-limiting examples of a user interface and gesture that can be used with a user interface to control the operations described herein are disclosed for example in U.S. Pat. No. 8,232,990 to King et. al.

Still further by way of example, when the 3D layer is made to appear, or in its initial appearance, the depth of the content of the 3D layer can be moderated. Yet further by way of example, the depth value of each display point in the 3D layer can set by its original depth value in the 3D video stream as adjusted by a current depth adjustment factor. For example, the initial adjustment factor, which can be used for example immediately after the 3D layer is made visible, can be relatively large, and so in its initial (visible) state the 3D layer appears to have relatively shallow depth. According to examples of the presently disclosed subject matter, the depth in the 3D layer can be gradually increased (block 225). Still further by way of example, the depth in the 3D layer can be decreased gradually as well. Yet further by way of example, the user can select the level of depth in the 3D layer and upon selection, the layers effects module 60 can be adapted to control the rate of changes that are imparted by the various layer effects. Thus, for example, in case a user chooses to transition from minimal depth to full depth, the transaction effect can be smoothed and appear gradually at a rate which is pleasing to the human perception system. In yet another example, the rate can be gradual to accommodate both an appealing appearance requirement on the one hand and a change detectability requirement on the other hand. If the change is too slow it may not be noticed by the user or the effect would be less dramatic. Thus, the layers effects module 60 can be configured to control the effects so that they are optimal at least in the sense that they are pleasing (rather than very abrupt) and impressive (not too slow to notice). Still further by way of example, the smoothing and other parameters of the effects can be selected and tuned, for example, manually by a user.

According to examples of the presently disclosed subject matter, the different layers can be positioned away from one another within the display space. The display space, is the virtual space in which the multilayer visual display is presented and in which the display can be controlled and manipulated. This is typically the same virtual space in which the 2D layer can be rotated and oriented.

Similarly to the 2D layer, the 3D layer and the 3D objects presented in the 3D layer can be rotated and moved within the virtual display space. Still further by way of example, when the 3D layer is initially presented, it is position perpendicularly to the 2D layer, as if it is projected from the 2D layer. According to determine to position of the 3D layer, the pose estimate module 18 can be consulted. Still further by way of example, as the display is rotated, the 2D layer and the 3D layer can be rotated together. By rotating the 2D layer and the 3D layer together, the source (the 2D layer) and projection (the 3D layer) sensation is maintained. The rotation can be carried out and controlled by the rotation module 30.

According to examples of the presently disclosed subject matter, the gap or displacement separating the 2D layer and the 3D layer can be set and controlled by a displacement module 64. Still further by way of example, initially the position of the 3D layer relative to the 2D layer can be relatively small. This initial distance can be predefined or can be determined according to various parameters of the scene or objects appearing in the scene. Yet further by way of example so long as the 3D layer is invisible, the distance between the 2D layer and the 3D layer is kept at its initial state. Still further by way of example, the changes in the relative position of the 2D layer and the 3D layer can be synchronized with the depth changes. Thus, for example, as the depth in the 3D layer is accentuated, the 2D layer and the 3D layer are distanced further apart and vice-versa.

According to examples of the presently disclosed subject matter, the layer effects engine 60 can further include a fade in/fade out module 66. The fade in/fade out module 66 can be configured to attenuate and/or accentuate the appearance of one or both of the layers (and more layers if more exist). For example, the fade in/fade out module 66 can be configured to attenuate the 2D layer while the 3D layer is accentuated, and vice-versa. According to examples of the presently disclosed subject matter, attenuation can include any of the following: reducing the luminance, reducing the density of the pixels, reducing the contrast, etc. Accentuating can include increasing the luminance, increasing the density of the pixels, increasing the contrast, etc.

According to examples of the presently disclosed subject matter, the fade in/fade out module 66 can be synchronized with the other components of the layer effects engine 60. Thus for example, the various components of the layer effects engine 60 can provide a multi-effect dynamic presentation in which the relationship between the 2D layer and the 3D layer evolve over time and the transition from 2D visual display to 3D visual display is gradual. The same applies for the reverse direction: from 3D to 2D. The pop-out and fade-out effects (and their reverse counterparts) provided by the layers effects engine 60 tie the 3D content to the more familiar 2D video and provide a viewer with a pleasing and engaging viewing experience.

Figure 7:
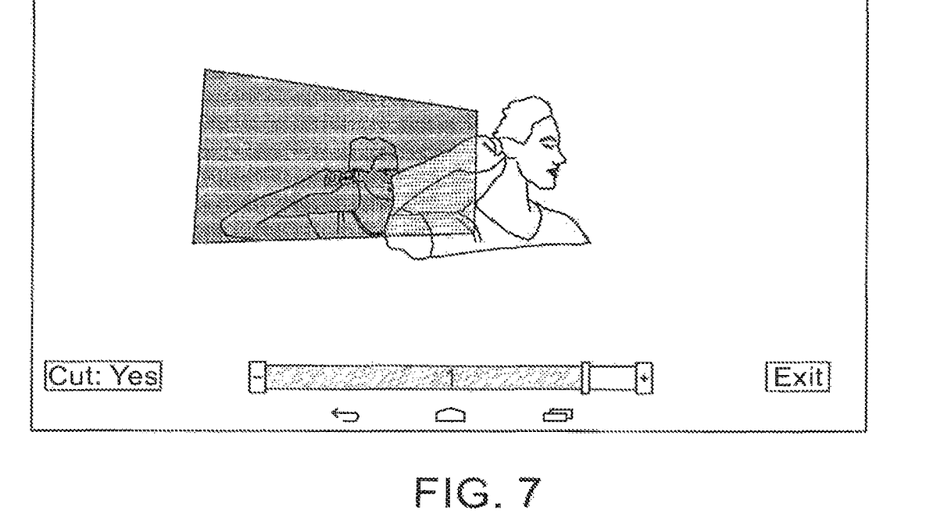
FIGS. 7-8 are renderings showing the pop-out and fade-out effects as they are gradually increased.
Figure 8:
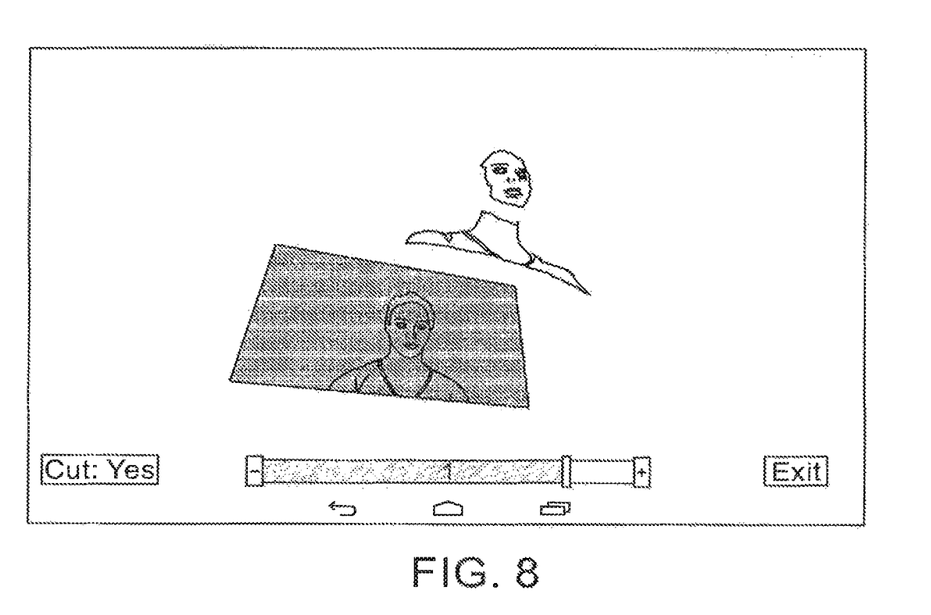
Figure 9:
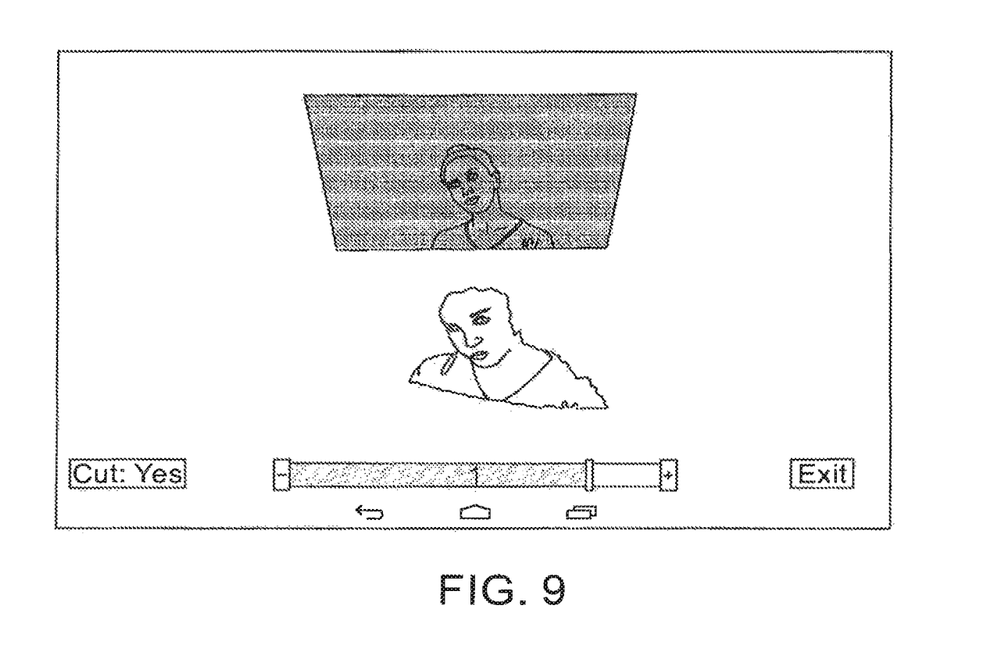
FIGS. 9-11 are renderings showing the layer effects at their most pronounced state, the 3D layer is on the front surface of the virtual sphere, whereas the 2D layer is all the way back on the sphere's back surface, the depth is at its full extent (say the depth factor is 1), and the 2D layer is significantly faded relative to its previous states.
Figure 10:
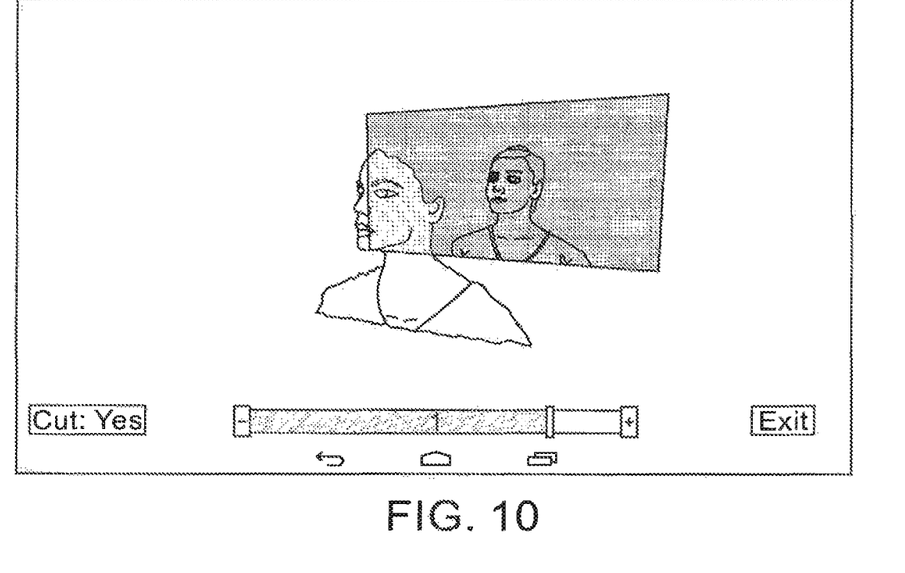
Figure 11:
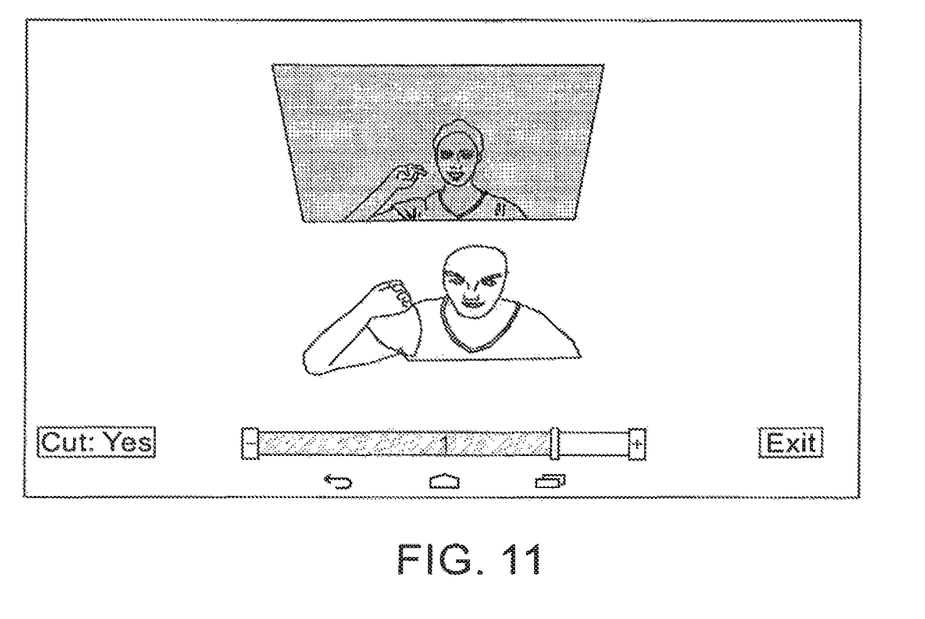
Figure 12:
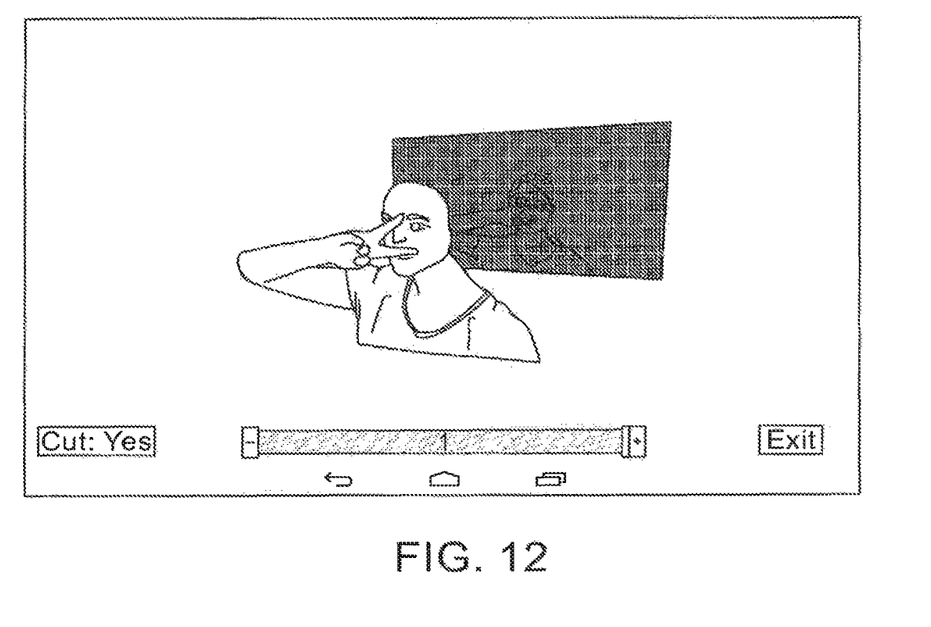
FIGS. 12-13 are renderings showing reducing the depth of the 3D layer and bringing the two layers closer to one another and fading-in the 2D layer.
Figure 13:
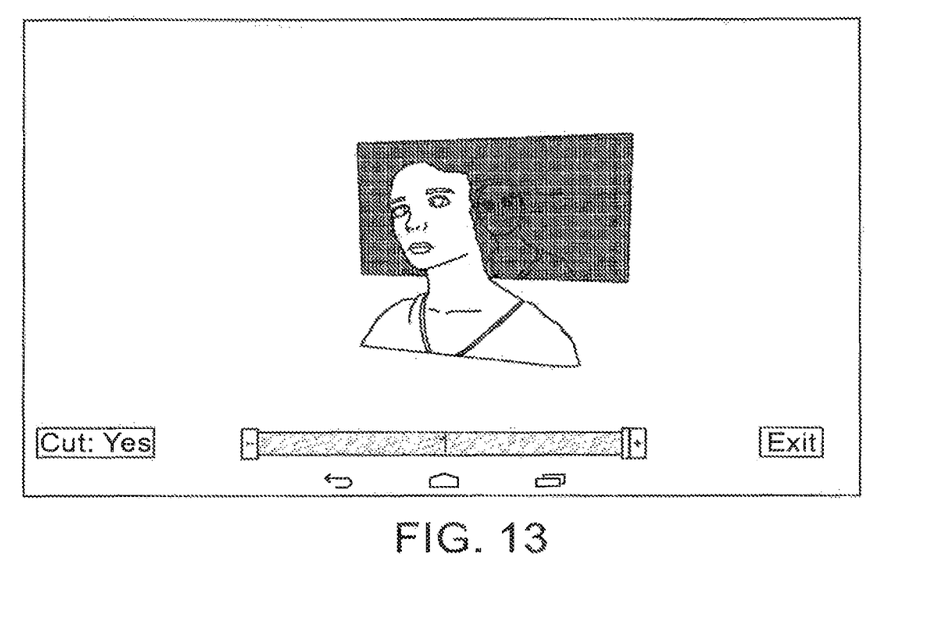

FIGS. 3-13 are now described. As mentioned above, FIG. 3 is the initial state of the multilayer visual display, where only the 3D layer is invisible. The 2D layer is not rotated and faces the surface of the display screen squarely. The 2D layer's display properties are according to the display screen settings (100% visibility). At some point the user may starts to rotate the multi-layer visual display, even before the 3D layer is visible, and the 2D layer is rendered to appear as if it is being rotated in a 3D shape, and in the case of FIGS. 3-13, this shape is a sphere. An example of the results of this effect on the 2D layer (before the 3D layer is made visible) are shown in FIGS. 4-5. Then, at some point an instruction is received, e.g., from a user, to show the 3D data. Following this instruction, the player 100 makes the 3D layer visible. As can be seen for example in FIG. 6, in its initial visible state, the depth of the 3D content in the 3D layer is almost flat, the 2D layer and the 3D layer are displayed relatively close to one another, and the 2D layer is only slightly faded. This is the initial pop-out (the 3D layer) and fade-out (the 2D layer) state of the multilayer visual display. For illustration, say that the depth factor is 0.1, such that the depth value of each point (e.g., pixel, particle, etc.) in the 3D layer is multiplied by the 0.1 depth factor. In FIGS. 7 and 8, the pop-out and fade-out effects are gradually increased. The depth in the 3D layer is increased (say a 0.75 factor is applied here) and is more visible, the 2D layer appears more faded and the 3D is "pushed" further to the front of the virtual sphere, while the 2D layer is moved further to the back of the virtual sphere. At the same time, as in every other state of the multilayer virtual display, the user can rotate the display within the virtual sphere (see the different orientation of the content in FIGS. 7 and 8, for example). In FIGS. 9-11 the layer effects are at their most pronounced state, the 3D layer is on the front surface of the virtual sphere, whereas the 2D layer is all the way back on the sphere's back surface, the depth is at its full extent (say the depth factor is 1), and the 2D layer is significantly faded relative to its previous states. This scenario can now be applied in the reverse direction, reducing the depth in the 3D layer, bringing the two layers closer to one another and fading-in the 2D layer as can be seen in FIGS. 12-13.

Although the preceding description sets forth a detailed description of various examples, it should be understood that the legal scope of the presently disclosed subject matter is defined by the words of the claims set forth below. The detailed description is to be construed as exemplary only and does not describe every possible example of the presently disclosed subject. Numerous alternative examples could be implemented, using either current technology or technology developed after the filing date of this patent, which would still fall within the scope of the claims defining the presently disclosed subject matter.

It should be understood that there exist implementations of other variations and modifications of the presently disclosed subject matter and its various aspects, as may be readily apparent to those of ordinary skill in the art, and that the presently disclosed subject matter is not limited by specific examples described herein. It is therefore contemplated to cover any and all modifications, variations or equivalents that fall within the scope of the basic underlying principals disclosed and claimed herein.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. A method of displaying multilayered visual data: obtaining a two-dimensional (2D) video stream and a three-dimensional (3D) video stream, where the 2D and the 3D video streams are synchronized; generating a multilayered visual display from the 2D and the 3D video streams, wherein over a sequence of a plurality of frames of the multilayered display, accentuating a visual appearance of a 3D layer corresponding to the 3D video stream relative to a visual appearance of a 2D layer corresponding to the 2D video stream, and further over the sequence of the plurality of frames accentuating a depth property of the 3D data underlying the 3D layer, and wherein accentuating a visual appearance of a 3D layer corresponding to the 3D video stream relative to a visual appearance of a 2D layer corresponding to the 2D video stream comprises increasing a displacement between the 3D layer and the 2D layer, wherein increasing a displacement comprises at least one of: moving the 3D layer forwards to a front portion of a virtual display space or moving the 2D layer backwards to a back portion of a virtual display space, and wherein accentuating a visual appearance of a 3D layer corresponding to the 3D video stream relative to a visual appearance of a 2D layer corresponding to the 2D video stream comprises at least one of: reducing the luminance in the 2D layer, reducing the density of the pixels in the 2D layer, reducing the contrast in the 2D layer, increasing the luminance in the 3D layer, increasing the density of the pixels in the 3D layer, or increasing the contrast in the 3D layer.

2. The method according to claim 1, wherein accentuating a depth property of the 3D data underlying the 3D layer comprises, adjusting a depth value of the 3D data underlying the 3D layer according to an original depth value of a corresponding point in the 3D video stream and a current depth adjustment factor.

3. The method according to claim 2, wherein a current depth adjustment factor is updated over the sequence of the plurality of frames, such that a depth effect in the 3D layer is respectively accentuated over the sequence of the plurality of frames.

* * * * *